United States Patent [19]

Barnett et al.

[11] Patent Number: 4,910,047

[45] Date of Patent: Mar. 20, 1990

[54] APPARATUS FOR CLEANING CARTRIDGE FILTERS IN A POWDER SPRAY SYSTEM

[75] Inventors: Phillip R. Barnett; Richard D. Burke, both of Amherst; Scott T. Wilson, Bay Village, all of Ohio

[73] Assignee: Nordson Corporation, Westlake, Ohio

[21] Appl. No.: 231,139

[22] Filed: Aug. 11, 1988

[51] Int. Cl.$^4$ .............................................. B05D 1/12
[52] U.S. Cl. .................................... 427/195; 427/421; 118/326; 98/115.2; 55/302
[58] Field of Search ................ 427/421, 195; 118/326; 98/115.5 B; 55/302

[56] References Cited

U.S. PATENT DOCUMENTS

| | | | |
|---|---|---|---|
| 3,499,268 | 3/1970 | Pausch | 55/302 |
| 3,509,698 | 5/1970 | Medcalf et al. | 55/302 |
| 3,594,992 | 7/1971 | Carr et al. | 55/302 |
| 3,816,978 | 6/1974 | O'Dell | 55/96 |
| 4,209,310 | 6/1980 | Berkhoel | 55/273 |
| 4,277,260 | 7/1981 | Browning | 55/273 |
| 4,279,340 | 3/1988 | Zeiss et al. | 118/634 |
| 4,364,751 | 12/1982 | Copley | 55/302 X |
| 4,378,728 | 4/1983 | Berkmann | 98/115.5 B |
| 4,409,009 | 10/1983 | Lissy | 55/302 |
| 4,492,003 | 1/1985 | Boylan | 15/406 |
| 4,504,293 | 3/1985 | Gillingham et al. | 55/302 X |
| 4,539,025 | 9/1985 | Ciliberti et al. | 55/302 |
| 4,590,884 | 5/1986 | Kreeger et al. | 118/308 |
| 4,662,309 | 5/1987 | Mulder | 118/312 |
| 4,704,953 | 11/1987 | Wilson | 98/115.2 |
| 4,730,647 | 3/1988 | Mulder | 141/67 |

Primary Examiner—Shrive P. Beck
Attorney, Agent, or Firm—Wood, Herron & Evans

[57] ABSTRACT

An apparatus for dislodging particulate powder material from the wall of a cartridge filter in the powder recovery unit of a powder spray system comprises a deflector plate mounted at the open top of the cartridge filter in the path of filtered air passing therethrough, and an air jet valve which directs a jet of air downwardly onto the deflector toward the open top of the cartridge filter so that the filtered air within the interior of the cartridge filter is pressurized and thereby reverses the direction of air flow through the filter wall to dislodge powder particles collected therefrom.

7 Claims, 2 Drawing Sheets

APPARATUS FOR CLEANING CARTRIDGE FILTERS IN A POWDER SPRAY SYSTEM

FIELD OF THE INVENTION

This invention relates to powder spray systems having powder recovery units, and, more particularly, to an apparatus and method for dislodging filtered particulate powder material from the wall of cartridge filters in the powder recovery units of a powder spray systems.

BACKGROUND OF THE INVENTION

Powder spray systems are well known in the art and representative systems are disclosed, for example, in U.S. Pat. Nos. 4,378,728; 4,409,009 and 4,590,884, all assigned to the assignee of this invention. As disclosed in these patents, the practice of powder coating involves the deposition of a powdered resin onto a substrate and thereafter heating the substrate and powder so that the powder melts and when subsequently cooled forms a solid continuous coating on the substrate. In many instances, an electrostatic charge is applied to the sprayed powder to increase the quantity of powder which attaches to the substrate and to assist in retaining the powder on the substrate.

Powder deposition is usually performed in a spray booth, i.e., a controlled area wherein any oversprayed powder which is not deposited on the substrate can be collected. Conventionally, the containment of oversprayed powder in the spray booth is aided by an exhaust system which creates a negative pressure within the spray booth and draws the powder entrained in a stream of air out of the spray booth into a powder recovery unit. In the powder recovery unit, the particulate powder material is separated from the air by a filter media, collected in a hopper and then usually returned to the powder source.

Many powder spray booths, including those disclosed in the patents listed above, employ cartridge filters as the filtering media within the powder collection chamber. Cartridge filters are conventionally cylindrical in shape having a filtering wall with a pleated outer surface and a hollow interior. These cartridge filters are mounted within a powder recovery chamber formed in the powder recovery unit at entrance openings to a filtered or clean air chamber therein. A blower carried in the powder recovery unit creates a negative pressure within the powder recovery chamber which draws air-entrained, oversprayed powder from the spray booth into contact with the cartridge filters in the powder collection chamber. The pleated outer surface of the cartridge filters is effective to collect most of the oversprayed powder withdrawn from the spray booth so that the air passing through the cartridge filters to the clean air chamber is filtered and substantially free of particulate powder material.

Periodically, the wall of the cartridge filters becomes so filled with collected particulate powder material that it must be cleaned in order to continue to effectively filter the particles from the air entering the collection chamber. Cleaning of the cartridge filters in prior art powder spray booths has been accomplished by either vibrating the particles off the wall of the filter or directing a reverse air flow through the filter, i.e., from the interior to the exterior, which dislodges the particles from the filter wall so that they fall into a collection hopper located beneath the filters.

As disclosed, for example, in U.S. Pat. No. 4,409,009, the reverse flow or jet of air employed to clean the cartridge filters is often directed through a venturi throat mounted within the clean air chamber at the openings over which the cartridge filters are mounted. These venturi throats accelerate the jet or blast of air into the interior of the cartridge filter which forms a shock wave therein to reverse the flow of air through the filter wall so that the particulate powder material is dislodged therefrom. After the short blast or jet of cleaning air is terminated, the flow of air in the opposite direction through the cartridge filters is resumed.

One problem with air blast cleaning systems for cartridge filters is that a relatively high pressure blast or jet of air, i.e., on the order of 90 psi, is required in order to effectively dislodge collected particulate powder material from the filter wall. The production of high pressure compressed air within a manufacturing facility requires equipment which is relatively expensive to purchase and operate. Even the periodic bursts or jets of high pressure air needed to clan the cartridge filters involves a substantial volume of compressed air which is expensive to produce.

Another problem with prior art air jet systems for cleaning cartridge filters is that venturi throats are often used to increase the speed of the air jet and ensure effective cleaning of the cartridge filter. As mentioned above, these venturi throats are commonly positioned in the clean air chamber above the cartridge filters, and, in turn, the air jet nozzle or other means for discharging the air jet is positioned above the venturi throat. This construction adds several inches to the overall height of the powder recovery unit which is unacceptable given the space requirements of some facilities.

SUMMARY OF THE INVENTION

It is therefore among the objectives of this invention to provide an apparatus for cleaning the cartridge filters of the powder collection unit in a powder spray system which effectively cleans the cartridge filters, which permits a reduction in the pressure of the air blast employed to clean the filter and which permits a reduction in the overall height of the powder recovery unit.

These objectives are accomplished in a powder spray system having a powder recovery unit which includes a filter module and a fan plenum. Oversprayed powder from a powder spray booth is entrained in an air stream and drawn by the fan plenum from the spray booth into the filter module where a bank or row of cartridge filters are mounted in a powder recovery chamber over openings leading to a clean air chamber. Particulate powder material is separated from the air stream and collected on the wall of each cartridge filter. The filtered air passing through the filter wall flows upwardly through the hollow interior of each cartridge filter into the clean air chamber of the filter module. A disk-shaped deflector plate is mounted near the top of each cartridge filter in a path of the filtered air moving through the filters into the clean air chamber. A jet or blast of air is directed from a nozzle onto the top surface of each deflector toward the top of the cartridge filter, and this air jet is effective to pressurize the filtered air within the interior of the cartridge filter so that the flow of air through the filter wall is reversed and the particles are dislodged therefrom.

This invention is predicated upon the concept of employing a blast or jet of air and a deflector plate mounted above the cartridge filter to pressurize the filtered air within the interior of the cartridge filter and thereby reverse the flow of air through the filter wall to dislodge particles therefrom. It is theorized that little or none of the blast or jet of air actually enters the interior of the cartridge filter. Instead, the filtered air flowing upwardly through the cartridge filter is pressurized for a short time period within its hollow interior and acts as a "plunger" to reverse the air flow through the filter wall.

In the presently preferred embodiment, each cartridge filter in the powder recovery unit is mounted over an opening formed in the bottom wall of the clean air chamber in the filter module. One deflector plate is mounted to the bottom wall of the clean air chamber at each opening and extends between such bottom wall and the top end of each cartridge filter. The deflector plate is preferably disk-shaped having an arcuate top surface which is concentrically disposed with respect to the inner diameter of the cartridge filter. The diameter of the deflector plate is less than the inner diameter of the cartridge filter so that a donut-shaped space or gap is formed therebetween.

A jet or blast of air is ejected from the nozzle of a valve located within the clean air chamber which is directed downwardly onto the top surface of the deflector plate and toward the top end of each cartridge filter. The valve is effective to deliver a blast or jet of pressurized air at a pressure of approximately 55 pounds per square inch for about 0.1 to 0.5 seconds. This air jet impacts the arcuate top surface of the deflector plate and is deflected radially outwardly therefrom into the donut-shaped space between the deflector plate and the inner diameter of the cartridge filter.

It is theorized that the deflector plate itself, and that portion of the air jet which is deflected radially outwardly from the top surface of the deflector plate, prevent most, if not all, of the air jet from entering the interior of the cartridge filter. It is believed that the force of the movement of the air jet to a location at or near the top of the cartridge filter pressurizes the filtered air within the interior of the cartridge filter, and this pressurized, filtered air reverses the direction of air flow through the filter wall. This reverse flow of air effectively dislodges particulate powder material from the pleated outer surface of the filter wall which is collected in a hopper located beneath the filters.

The apparatus of this invention for cleaning cartridge filters within a powder recovery unit of a powder spray system has several advantages over the prior art. It has been found that the pressure of the blast or jet of air needed to effectively clean the cartridge filter, in the manner described above, is about 55 pounds per square inch. In comparison, prior art air jets for cleaning cartridge filters require a pressure of about 90 pounds per square inch in order to enter the interior of the filter and create a shock wave therein which reverses the air flow through the filtered wall to dislodge particles. The production and use of pressurized air is relatively expensive and reduced pressure levels require less volume of air.

Another advantage of this invention is that the overall height of the powder recovery unit of the powder spray system can be minimized. The valve and nozzle which deliver the air jet herein are placed relatively close to the deflector plate and cartridge filters, i.e., about nine inches away. Venturi throats commonly employed in the prior art to accelerate the air jet into the cartridge filters are eliminated in this invention. As a result, the overall height of the powder recovery unit is reduced making it easier to locate within more customer facilities.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
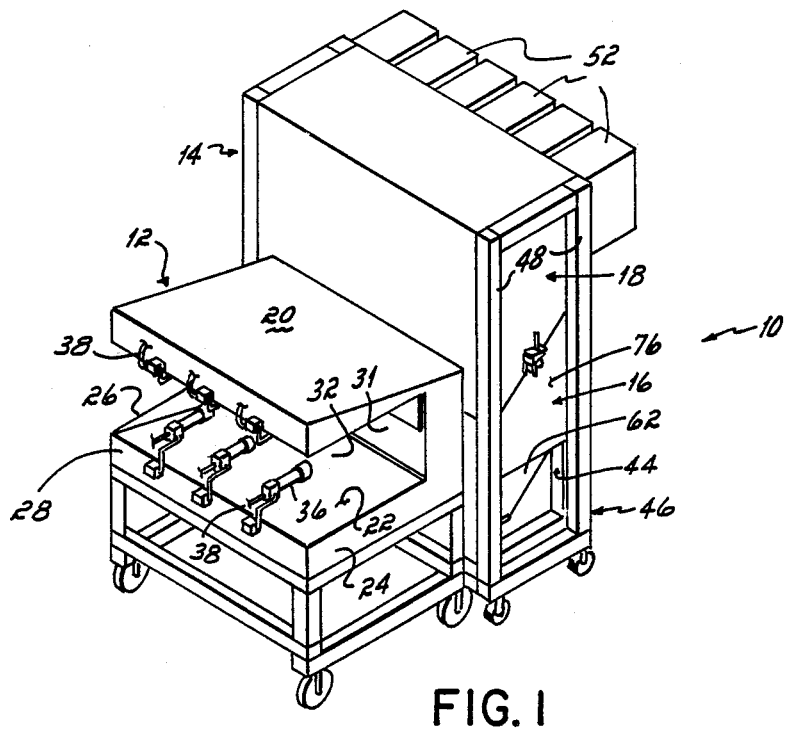
FIG. 1 is a perspective view of a powder spray system with which this invention is employed.

Referring to FIG. 1, a powder spray system 10 is illustrated of the type disclosed in U.S. Pat. No. 4,590,884, the disclosure of which is incorporated by reference in its entirety herein. The overall construction of the powder spray system 10 forms no part of this invention per se and is described briefly herein. Reference should be made to U.S. Pat. No. 4,590,884 for a detailed description of system 10.

The powder spray system 10 comprises a powder spray booth 12 and a powder recovery unit 14 consisting of a filter module 16 and a fan plenum 18. The powder spray booth 12 comprises a top wall 20, bottom wall 22, side walls 24 and 26, a front wall 28 and a rear wall 30 having an opening 31. A spray chamber 32 is defined internally of these walls. A group of upper spray guns 34 and lower spray guns 36 connected to powder supply lines 38 are mounted to the front wall 28 of the spray booth 12 and are aimed at the interior of spray chamber 32.

Figure 2:
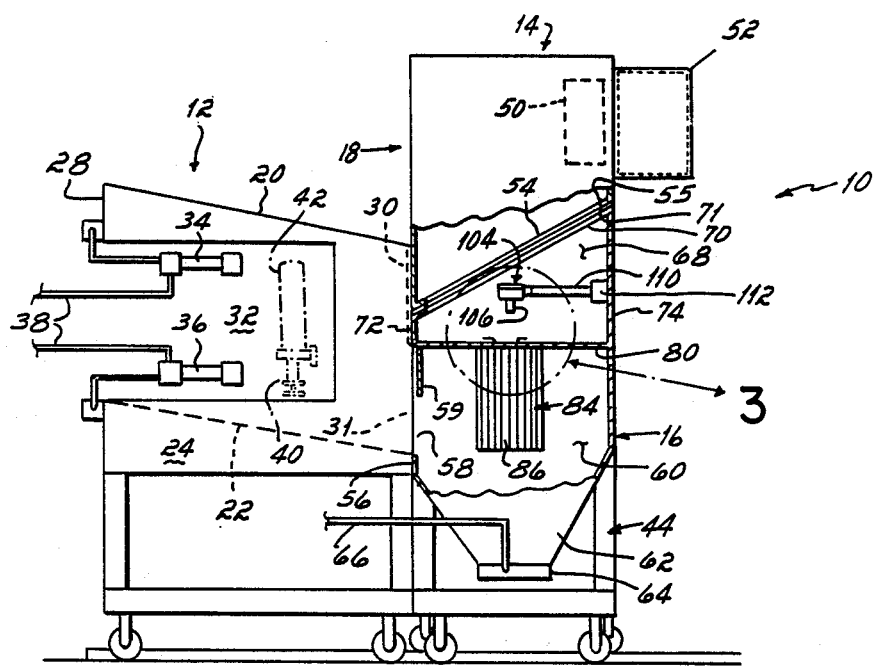
FIG. 2 is a side elevational view of FIG. 1 in partial cross section.

As shown in FIG. 2, the front wall 28 and both side walls 24, 26 of spray booth 12 are formed with openings so that the spray booth 12 can be moved on its roller supported base 38 into alignment with a conveyor 40 which supports a product 42 to be coated. With the spray booth 12 in this position, the filter module 16 and fan plenum 18 of the powder recovery unit 14 are moved on their roller-supported frames 44, 46, respectively, against the rear wall 30 of spray booth 12.

The fan plenum 18 of powder recovery unit 14 includes upright stanchions or legs 48 forming the frame 46 thereof which support a blower 50 and a bank or row of final filters 52. The fan plenum 18 is open at its bottom 54. This open bottom 54 has a peripheral flange 55.

The filter module 16 comprises a sheet metal enclosure having a front wall 56 formed with an opening 58, which is partially covered by a pivotable deflector 59. In the assembled position of spray booth 12 and filter module 16 shown in FIGS. 1 and 2, the filter module 16 communicates with the spray chamber 32 of spray booth 12. The interior of the filter module 16 forms a powder recovery chamber 60 beneath which a hopper 62 is mounted for collecting powder. A pump 64 is carried at the base of hopper 62 which is adapted to pump collected powder through a tube 66 back to a powder source (not shown).

The upper portion of filter module 16 is formed with a clean air chamber 68 having an open top 70. This open top has a flange 71 around its perimeter and is angled to mate with the angled flange 55 of the bottom 54 of fan plenum 18. The clean air chamber 68 also has a front wall 72, back wall 74, opposed side walls 76 and a bottom wall 80. The bottom wall 80 is formed with a plurality of openings 82, one of which is shown in FIG. 3, which extend between the filter chamber 60 and clean air chamber 68.

Figure 3:
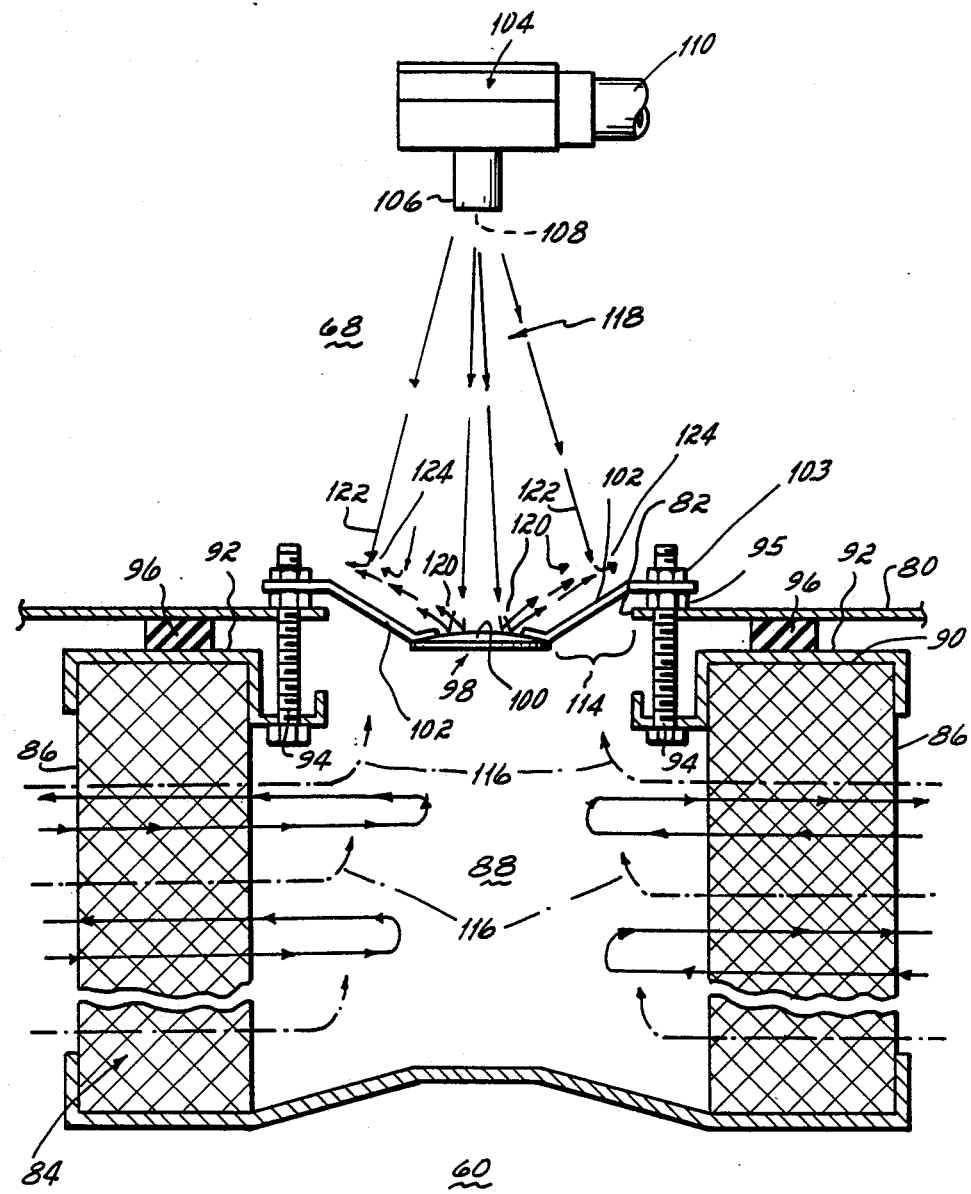
FIG. 3 is an enlarged view in partial cross section of the circled portion of FIG. 2.

With reference to FIGS. 2 and 3, a bank or row of cartridge filters 84, one of which is shown in FIG. 3, are mounted over the openings 82 in the bottom wall 80 of clean air chamber 68. Each cartridge filter 84 comprises a pleated wall 86, a hollow interior 88 and a top end 90 which carries a mounting bracket 92. This mounting bracket 92 is connected by bolts 94 and nuts 95 to the bottom wall 80 of clean air chamber 68. Preferably, a seal 96 is interposed between the bracket 92 and bottom wall 80 to prevent the passage of air or particulate powder material therebetween.

In the presently preferred embodiment, a disk-shaped deflector plate 98 is concentrically mounted relative to the hollow interior 88 of cartridge filter 84 between the bottom wall 80 of clean air chamber 68 and the top end 90 of cartridge filter 84. The deflector plate 98 is a relatively thin annular disk having n arcuate top surface 100. Preferably, the top surface 100 has a convex curvature of approximately 2° which is exaggerated in the Figures for purposes of illustration. As shown in FIG. 3, the deflector plate 98 is supported from the bottom wall 80 of clean air chamber 68 by a spider mount consisting of three legs 102 each fixed to the arcuate top surface 100 of deflector plate 98 and extending radially outwardly to the bolts 94 where they are mounted thereto by nuts 103. Only two of the legs 102 are shown in FIG. 3 for ease of illustration.

An air jet valve 104 having a nozzle 106 formed with a discharge opening 108 is mounted within clean air chamber 68 directly above the deflector plate 98. The valve 104 is connected to a pipe 110 extending outwardly from a manifold 112 carried on the back wall 74 of clean air chamber 68. The manifold 112 transmits pressurized air through pipe 110 to valve 104, preferably at a pressure of about 55 psi.

In one specific embodiment of this invention, the air jet valve 104 is a 1 inch Goyen Valve, Part No. RCA25TD, commercially available from Goyen Controls. The discharge opening 108 of the nozzle 106 of valve 104 is 1 inch in diameter and is positioned 9 inches vertically above the arcuate top surface 100 of deflector plate 98 within the clean air chamber 68. The deflector plate 98 is preferably 3 inches in diameter and its arcuate top surface 100 is positioned about 3/16 of an inch beneath the underside of the bottom wall 80 of clean air chamber 68. As viewed in FIG. 3, the diameter of a deflector plate 98 is roughly ⅓ of the inside diameter of cartridge filter 84 and roughly ½ of the diameter of the opening 82 formed in the bottom wall 80 of clean air chamber 68. Therefore, a donut-shaped space 114 is formed between the deflector plate 98 and the opening 82.

The operation of the powder spray system 10 and the cartridge filter cleaning apparatus of this invention is as follows. Particulate powder material is discharged from the spray guns 34, 36 toward a product 42 carried by the conveyor 40 within the spray chamber 32 of powder spray booth 12. Not all of the particulate powder material is deposited on the product 42 and this oversprayed powder material is entrained in air and drawn by the blower 50 within the fan plenum 18 out of the spray chamber 32 into the filter chamber 60. In the filter chamber 60, the particulate powder material is collected on the pleated wall 86 of cartridge filter 84 and the air carrying the powder is drawn into the hollow interior 88 of the cartridge filter 84. This filtered air 116 moves upwardly through the hollow interior 88 of cartridge 84, as shown in phantom in FIG. 3, past the deflector plate 98 and into the clean air chamber 68. The filtered air continues upwardly (not shown) from the clean air chamber 68 into the fan plenum 18 where it passes through final filters 52 before being exhausted to atmosphere.

After a period of time, the wall 86 of cartridge filter 84 becomes heavily covered with particulate powder material and must be cleaned in order to maintain filter efficiency. This cleaning operation is performed by a blast or air jet 118 from the nozzle 106 of valve 104 which is directed downwardly onto the arcuate top surface 100 of deflector plate 98 and toward the top end 90 of cartridge filter 84.

The exact operation of the air jet valve 104 and deflector plate 98 in dislodging particulate powder material from the wall 86 of cartridge filter 84 is not completely understood. It is theorized, however, that the air jet 118 is ejected from the discharge opening 108 of nozzle 106 and expands radially outwardly as it travels toward the deflector plate 98. A portion 120 of the air jet 118 impacts the arcuate top surface 100 of deflector plate 98 and is deflected radially outwardly into contact with that portion 122 of the air jet 118 which is moving toward the donut-shaped opening 114 between the deflector plate 98 and the opening 82 in clean air chamber 68. The collision between the deflected air 120, and the portion 122 of the air jet directed toward opening 114, forms a turbulence area 124 above the top end 90 of the cartridge filter 84. It is believed that this turbulence area 124 substantially prevents any of the air jet 118 from entering the hollow interior 88 of the cartridge 84. Instead of entering the cartridge filter 84, the downwardly directed force of the air jet 118 pressurizes the filtered air 116 within the hollow interior 88 of cartridge filter 84 and thereby reverses the flow of air through the filter wall 86. See solid lines in FIG. 3. This pressurized, filtered air acts as a plunger within filter 84 in reversing the air flow through the filter wall 86 which effectively dislodges particulate powder material from the filter wall 86.

It has been found that an air jet 118 at a relatively low pressure of about 55 psi, ejected in a blast having a duration of about 0.1 to about 0.5 seconds, creates a substantially uniform pressure of the filtered air within the hollow interior 88 of cartridge filter 84. This effectively dislodges particulate powder material throughout the length of the filter wall 86. The dislodged particulate powder material is then collected in the hopper 62 beneath filters 84.

While the invention has been described with reference to a preferred embodiment, it is will be understood by those skilled in the art that various changes may be made and equivalence may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the appended claims.

What is claimed is:

1. A powder spray system, comprising:
    a spray booth providing a controlled area for the powder coating of substrates;
    a powder recovery chamber communicating with said spray booth for collecting air-entrained oversprayed powder from said spray booth;
    a clean air chamber sealed from said spray booth and from said powder recovery chamber, said clean air chamber having a bottom wall formed with at least one opening;
    at least one cartridge filter having a wall defining a hollow interior and an open top, said cartridge filter being mounted to said bottom wall of said clean air chamber so that said open top of said cartridge filter faces said opening in said bottom wall and said wall of said cartridge filter extends into said powder recovery chamber;
    a blower operative to draw air-entrained, oversprayed powder from said spray booth, into said powder recovery chamber and to said cartridge filter, the oversprayed powder being collected on said wall of said cartridge filter and the air carrying the oversprayed powder being drawn into said hollow interior of said cartridge filter to form filtered air, said filtered air being drawn upwardly through said open top of said cartridge filter into said clean air chamber;
    jet means for periodically directing a jet of air toward said open top of said cartridge filter;
    a deflector mounted near the top of said cartridge and in the path of said jet of air discharged from said jet means, said deflector being effective to deflect one portion of said jet of air radially outwardly relative to said open top of said cartridge filter which substantially prevents the remainder of said jet of air from entering said hollow interior of said cartridge filter, the filtered air within said hollow interior of said cartridge filter being pressurized by said jet of air so that the direction of flow of air through said wall of said cartridge filter is reversed to dislodge powder collected thereon.

2. The apparatus of claim 1 in which said deflector comprises a disk-shaped plate mounted between said bottom wall of said clean air chamber and said open top of said cartridge filter.

3. The apparatus of claim 2 in which said hollow interior of said cartridge filter is substantially cylindrical-shaped, said disk-shaped plate being mounted to said bottom wall of said clean air chamber substantially concentric relative to said cylindrical-shaped hollow interior of said cartridge filter.

4. The apparatus of claim 3 in which the diameter of said disk-shaped plate is less than the diameter of said cylindrical-shaped hollow interior of said cartridge filter.

5. The apparatus of claim 1 in which said deflector comprises a disk-shaped plate having an arcuate-shaped top surface which faces said jet means.

6. The apparatus of claim 5 in which said top surface of said disk-shaped plate is a convex-shaped surface having a curvature of about 2°.

7. The method of dislodging particulate powder material from the wall of a cartridge filter in the powder recovery unit of a powder spray system, comprising:
    directing a flow of air-entrained particulate powder material to the wall of a cartridge filter so that the particulate powder material collects on the wall and the air passes through the wall and enters the hollow interior of the cartridge filter forming filtered air;
    moving the filtered air in the hollow interior of the cartridge filter toward the open top thereof;
    periodically directing a jet of air toward the open top of the cartridge filter in a direction opposite to the direction of movement of the filtered air within the hollow interior of the cartridge filter;
    deflecting a portion of said jet of air radially outwardly relative to said open top of said cartridge filter with a deflector positioned near the top of said cartridge and in the path of said jet of air so that the remaining portion of said jet of air is substantially prevented from entering the open top of the cartridge filter and so that the filtered air within the hollow interior of said cartridge filter is pressurized, the direction of flow of air through the wall of the cartridge filter being reversed by pressurization of the filtered air within the interior of said cartridge filter to dislodge particulate powder material collected on said wall thereof.

* * * * *